United States Patent
Lawrey et al.

(10) Patent No.: US 6,906,163 B2
(45) Date of Patent: Jun. 14, 2005

(54) PREPOLYMER CATALYSTS SUITABLE FOR PREPARING SPANDEX FIBERS

(75) Inventors: Bruce D. Lawrey, Moon Township, PA (US); Thomas A. J. Gross, Wulfrath (DE); Rolf-Volker Meyer, Much (DE)

(73) Assignee: Bayer Materialscience LLC, Pittsburgh, PA (US)

( * ) Notice: Subject to any disclaimer, the term of this patent is extended or adjusted under 35 U.S.C. 154(b) by 0 days.

(21) Appl. No.: 10/158,988

(22) Filed: May 30, 2002

(65) Prior Publication Data

US 2003/0225242 A1 Dec. 4, 2003

(51) Int. Cl.$^7$ .............................................. C08G 18/16
(52) U.S. Cl. ............................ 528/55; 528/56; 528/57; 528/58; 528/61; 528/64; 528/906
(58) Field of Search ............................ 528/55–58, 61, 528/64, 906

(56) References Cited

U.S. PATENT DOCUMENTS

| | | | |
|---|---|---|---|
| 3,180,854 A | 4/1965 | Schneider et al. | 260/77.5 |
| 3,384,623 A | 5/1968 | Inoue et al. | 260/75 |
| 3,393,243 A | 7/1968 | Cuscurida | 260/615 |
| 3,427,256 A | 2/1969 | Milgrom | 252/431 |
| 3,427,334 A | 2/1969 | Belner | 260/429 |
| 3,427,335 A | 2/1969 | Herold | 260/429 |
| 3,483,167 A | 12/1969 | Sommer et al. | 260/75 |
| 3,829,505 A | 8/1974 | Herold | 260/611 B |
| 3,941,849 A | 3/1976 | Herold | 260/607 A |
| 4,282,387 A | 8/1981 | Olstowski et al. | 568/618 |
| 4,687,851 A | 8/1987 | Laughner | 544/398 |
| 5,010,117 A | 4/1991 | Herrington et al. | 521/159 |
| 5,010,187 A | 4/1991 | Heuvelsland | 536/120 |
| 5,114,619 A | 5/1992 | Heuvelsland | 252/182.27 |
| 5,340,902 A | 8/1994 | Smith et al. | 528/61 |
| 5,576,382 A | 11/1996 | Seneker et al. | 524/591 |
| 5,691,441 A | * 11/1997 | Senekar et al. | |
| 5,708,118 A | 1/1998 | Seneker et al. | 528/61 |
| 5,723,563 A | 3/1998 | Lawrey et al. | 528/61 |

FOREIGN PATENT DOCUMENTS

| | | |
|---|---|---|
| EP | 1 110 984 | 6/2001 |
| WO | 98/01492 | 1/1998 |

OTHER PUBLICATIONS

Polyurethane Handbook, (Gunther Oertel, Ed., Carl Hanser Verlag Pub., Munich, (month unavailable) 1985, Reactants, p. 578, Polyurethane Elastomeric Fibers.
Polyurethanes: Chemistry and Technology, vol. XVI, Part 1, (month unavailable) 1962, p. 73, J.H. Saunders and K.C. Frisch, "Reactions of Isocyanates and their Derivatives".

* cited by examiner

Primary Examiner—Rachel Gorr
(74) Attorney, Agent, or Firm—Joseph C. Gil; Lyndanne M. Whalen

(57) ABSTRACT

Segmented polyurethane/ureas useful for the production of spandex, particularly spandex fibers, are made from isocyanate-terminated prepolymers formed by reacting excess isocyanate with an isocyanate-reactive component satisfying specified compositional requirements in the presence of a catalyst which promotes linear polymerization but does not cause degradation of the polymer. Suitable catalysts include metal salts of organic fatty acids and/or of naphthenic acid. The isocyanate-reactive component includes at least 10 equivalent percent of a polyoxypropylene diol having a number average molecular weight of at least about 1500 Da and an average unsaturation level less than or equal to 0.03 meq/g and up to 90 equivalent percent of a polytetramethylene glycol having a number average molecular weight of at least 200 Da.

15 Claims, No Drawings

US 6,906,163 B2

PREPOLYMER CATALYSTS SUITABLE FOR PREPARING SPANDEX FIBERS

FIELD OF THE INVENTION

The present invention relates to segmented polyurethane/ureas having excellent elasticity, mechanical and thermal properties, to fibers made with such polyurethane/ureas, and to processes for the production of such polyurethane/ureas and fibers. More particularly, the present invention pertains to polyurethane/ureas and spandex fibers made from prepolymers derived from slow reacting polyols or mixtures of fast and slow reacting polyols (particularly admixtures of polytetramethylene ether glycols (PTMEG) and low unsaturation, high molecular weight polyoxyalkylene diols) which have been produced from isocyanate-terminated prepolymers produced in the presence of a particular type of catalyst.

BACKGROUND OF THE INVENTION

Polyurethane/ureas which produce fibers and films with elastomeric characteristics have found wide acceptance in the textile industry. The term "spandex", often used to describe these polyurethane/ureas, refers to long chain synthetic polymers made up of at least 85% by weight of segmented polyurethane. The term "elastane" is also used (e.g., in Europe) to describe these polymers. Spandex is used for many different purposes in the textile industry, especially in underwear, form-persuasive garments, bathing wear, and elastic garments or stockings. The elastomeric fibers may be supplied as core spun elastomer yarns spun round with filaments or staple fiber yarns or as a staple fiber in admixture with non-elastic fibers for the purpose of improving the wearing qualities of fabrics which are not in themselves highly elastic.

In the past, thread made of natural rubber was the only material available to provide elasticity to fabrics. Spandex, originally developed in the 1950s, has numerous advantages over such rubber filaments. The most important of these is its higher modulus. Typically, for a given denier, spandex has at least twice the recovery, or retractive power, of rubber. This enables stretch garments to be manufactured with less elastic fiber and thus be lighter in weight. Additional advantages over natural rubber include the ability to obtain spandex in much finer deniers, higher tensile strength and abrasion resistance, and in many cases, higher resilience. Additionally, spandex exhibits improved resistance to many cosmetic oils, to solvents (for example, those used in dry cleaning), and a high resistance to oxidation and ozone as well. Furthermore, in contrast to rubber filaments, spandex fibers can be dyed relatively easily with certain classes of dyestuffs.

Preparation of elastomeric polyurethane/ureas by the polyaddition process from high molecular weight, substantially linear polyhydroxyl compounds, polyisocyanates and chain lengthening agents which have reactive hydrogen atoms by reaction in a highly polar organic solvent is known. The formation of fibers, filaments, threads, and films from these solvent-borne polyurethane/ureas and by reactive spinning is also known. See, e.g., U.S. Pat. Nos. 3,483,167 and 3,384,623 which disclose preparation of spandex fibers from isocyanate-terminated prepolymers prepared with polymeric diols.

Spandex made with PTMEG-derived prepolymers and polymers does not have the elongation or the low hysteresis of natural rubber but it is characterized by improved retractive power, higher tensile strength and the ability to better withstand oxidative aging. These improved features have made PTMEG-derived spandex the industry standard, despite the difficulties associated with PTMEG-derived prepolymers and polymers, and the relatively high cost of PTMEG itself.

For the reasons discussed above, the commercially preferred polymeric diol is polytetramethylene ether glycol (PTMEG). PTMEG is a solid at room temperature and produces prepolymers, particularly, diphenylmethane diisocyanate ("MDI") prepolymers having extremely high viscosities.

However, despite the inherent difficulties of handling PTMEG, its high cost and the unsatisfactory hysteresis of fibers made with PTMEG, PTMEG continues to be the mainstay of spandex production because, to date, no satisfactory substitute has been found.

One potential substitute for PTMEG which has been evaluated is polyoxypropylene glycol ("PPG") which, in principle, could be used to prepare spandex fibers. Preparation of spandex fibers from a prepolymer made with a polyol component composed primarily of PPG is attractive from an economic point of view because the cost of PPG is significantly lower than that of PTMEG. In addition, fiber prepared from prepolymers made with PPGs exhibit excellent elongation and retractive or holding power. PPGs are inherently easier to handle than PTMEG because they are non-crystallizable, relatively low viscosity liquids with low pour points.

By contrast, PTMEGs are typically solids at 20 to 40° C. depending on the grade.

U.S. Pat. No. 3,180,854, for example, discloses a polyurethane/urea fiber based on a prepolymer made with a 2000 Da molecular weight polyoxypropylene glycol. However, the properties of polyoxypropylene-derived spandex fibers are generally inferior to those of fibers based on PTMEG. Consequently, polyoxypropylene glycols have not been utilized commercially in spandex production. See, e.g., the POLYURETHANE HANDBOOK (Gunther Oertel, Ed., Carl Hanser Verlag Pub., Munich 1985, p. 578) which states: "Polypropylene glycols have so far been used as soft segments only in experimental products since they produce inferior elastanes". (at page 578)

High molecular weight polyoxypropylene glycols made by conventional processes contain high percentages of terminal unsaturation or monofunctional hydroxyl-containing species ("monol"). The monol is believed by many to act as a chain terminator, limiting the formation of the required high molecular weight polymer during chain extension and yielding products which are generally inferior in comparison to PTMEG-derived elastomers.

The majority of polyoxyalkylene polyether polyols are polymerized in the presence of a pH-basic catalyst. For example, polyoxypropylene diols are prepared by the base catalyzed oxypropylation of a difunctional initiator such as propylene glycol. During base catalyzed oxypropylation, a competing rearrangement of propylene oxide to allyl alcohol continually introduces an unsaturated, monofunctional, oxyalkylatable species into the reactor. The oxyalkylation of this monofunctional species yields allyl-terminated polyoxypropylene monols. The rearrangement is discussed in BLOCK AND GRAFT POLYMERIZATION, Vol. 2, Ceresa, Ed., John Wiley & Sons, pp. 17–21.

Unsaturation is measured in accordance with ASTM D-2849-69 "Testing Urethane Foam Polyol Raw Materials," and expressed as milliequivalents of unsaturation per gram of polyol (meq/g).

Due to the continual formation of allyl alcohol and its subsequent oxypropylation, the average functionality of the polyol mixture decreases and the molecular weight distribution broadens. Base-catalyzed polyoxyalkylene polyols contain considerable quantities of lower molecular weight, monofunctional species. In polyoxypropylene diols of 4000 Da molecular weight, the content of monofunctional species may lie between 30 and 40 mol percent. In such cases, the average functionality is lowered to approximately 1.6 to 1.7 from the nominal, or theoretical functionality of 2.0. In addition, the polyols have a high polydispersity, $M_w/M_n$ due to the presence of a substantial amount of low molecular weight fractions.

Lowering unsaturation and the attendant large monol fraction in polyoxypropylene polyols has been touted as a means for production of polyurethane elastomers having improved properties. For example, use of polyols having a low content of monofunctional species has been suggested as a method for increasing polymer molecular weight. Increased polymer molecular weight has, in turn, been cited as desirable in producing higher performance polymers.

Reducing unsaturation in polyoxyalkylene polyols by lowering catalyst concentration and decreasing the reaction temperature is not feasible because even though low unsaturation polyols may be prepared, the reaction rate is so slow that oxypropylation takes days or even weeks. Thus, efforts have been made to discover catalysts capable of producing polyoxypropylated products in a reasonable amount of time without introducing monofunctionality due to allylic species.

In the early 1960's, double metal cyanide catalysts such as zinc hexacyano-cobaltate complexes were developed to accomplish this objective. Such complexes are disclosed in U.S. Pat. Nos. 3,427,256; 3,427,334; 3,427,335; 3,829,505; and 3,941,849. Although the unsaturation level is lowered to approximately 0.018 meq/g, the cost of these catalysts coupled with the need for lengthy and expensive catalyst removal steps prevented commercialization of processes for the production polyoxyalkylene polyols using these catalysts.

Other alternatives to basic catalysts such as cesium hydroxide and rubidium hydroxide are disclosed in U.S. Pat. No. 3,393,243. Barium and strontium oxide and hydroxide catalysts (disclosed in U.S. Pat. Nos. 5,010,187 and 5,114,619) enabled modest improvements with respect to unsaturation levels. However, catalyst expense, and in some cases, toxicity, and the modest level of improvement attributable to these catalysts, mitigated against their commercialization. Catalysts such as calcium naphthenate and combinations of calcium naphthenate with tertiary amines have proven to be useful in preparing polyols with unsaturation levels as low as 0.016 meq/g, and more generally in the range of from 0.02 to 0.04 meq/g. (See, e.g., U.S. Pat. Nos. 4,282,387; 4,687,851; and 5,010,117.)

In the 1980's, use of double metal cyanide complex (DMC) catalysts was revisited. Improvements in catalytic activity and catalyst removal methods encouraged commercial use of DMC catalyzed polyols having low unsaturation levels (in the range of from 0.015 to 0.018 meq/g) commercially for a brief time. However, base catalysis continued to be the primary method used to produce polyoxypropylene polyols. pH-basic catalysts continue to be the catalysts which are primarily used in commercial polyoxyalkylene polyol production processes.

Major advances in DMC catalysts and polyoxyalkylation processes have enabled preparation of ultra-low unsaturation polyoxypropylene polyols on a commercial scale. High molecular weight polyols (molecular weight in the 4000 Da to 8000 Da range) typically exhibit unsaturation levels in the range of from 0.004 to 0.007 meq/g when catalyzed by these improved DMC catalysts. At these levels of unsaturation, only 2 mol percent or less of monofunctional species is present. GPC analysis of these polyols shows them to be virtually monodisperse, often exhibiting polydispersities of less than 1.10. Several such polyols have recently been commercialized as ACCLAIM™ polyols.

Despite the dramatic reductions in unsaturation achieved through new polyoxyalkylation processes in recent years, PPGs still react more slowly with isocyanates than other polyols such as PTMEG. This is largely due to the presence of essentially 100% primary hydroxyl groups in polyols such as PTMEG while PPGs contain substantial amounts of secondary hydroxyl groups. It is known that secondary hydroxyl groups will react significantly more slowly with isocyanates than primary hydroxyl groups. (See, e.g., Saunders and Frisch, *POLYURETHANES: Chemistry and Technology*, Volume XVI, Part I, page 73 (Wiley & Sons (1962)).) Therefore, the use of a polyol such as PPG to prepare the prepolymer for the spandex polymer spinning solution requires a significantly longer reaction time than that required to prepare a PTMEG prepolymer. This longer reaction time is obviously unattractive from a process economics point of view. It is also undesirable because a longer reaction time allows more branching side reactions to take place (e.g., allophanate formation). Prepolymers with significant levels of branching produce spinning solutions with rheological characteristics that make them unacceptable for spinning. Chain extension of such a branched prepolymer in solvent may even result in gelation.

It would be desirable to develop a method for catalyzing the reaction between isocyanates and polyols which contain at least some slower reacting, secondary hydroxyl groups. To date, it is taught in the prior art that although the isocyanate/polyol prepolymer-forming reaction may be catalyzed, it is preferred that no catalyst be used (U.S. Pat. No. 5,708,118) or that the reaction may be catalyzed with standard catalysts such as dibutyl tin dilaurate or stannous octoate (U.S. Pat. Nos. 5,340,902 and 5,723,563). It has been found, however, that use of a catalyst such as dibutyl tin dilaurate has an adverse effect upon the tenacity of fibers spun with the catalyzed prepolymer. (See Comparative Examples 8 and 10 herein.)

It would therefore be desirable to develop a method for producing a prepolymer from a polyol containing secondary hydroxyl groups which proceeds at a relatively rapid rate, produces a substantially linear prepolymer with minimal branching which can be used to prepare a polymer solution exhibiting rheological characteristics suitable for high speed spinning.

SUMMARY OF THE INVENTION

It is an object of the present invention to provide a polyurethane/urea useful for the production of spandex having excellent physical properties and an economically advantageous method for the production of such polyurethane/urea from a polyol containing a significant number of secondary hydroxyl groups.

It is another object of the present invention to provide a catalyzed process for the production of a prepolymer useful in making spandex fibers in which the catalyst employed does not promote polymer degradation during spinning or subsequent fiber knitting/processing at elevated temperatures.

It is also an object of the present invention to provide polyurethane/ureas useful for the production of spandex fibers which are made from a significant amount of PPG which spandex fibers have physical properties comparable to those of spandex fibers made with 100% PTMEG.

It is another object of the present invention to provide a process for the production of polyurethane/ureas and spandex fibers made from such polyurethane/ureas in which the advantageous physical properties of fiber made with PTMEG are achieved and the prepolymer viscosity and fiber hysteresis are reduced.

It is a further object of the present invention to provide polyurethane/ureas and spandex fibers made from such polyurethane/ureas which are based in part on less expensive and easier to handle polyoxypropylene glycols and which exhibit improved properties as compared to spandex fibers made solely with PTMEG.

It is yet another object of the present invention to provide spandex fibers and a process for making spandex fibers characterized by excellent tenacity, elongation, retractive power, and set.

These and other objects which will be apparent to those skilled in the art are accomplished by conducting the prepolymer-formation reaction in the presence of a catalyst which promotes linear polymerization but does not cause degradation of the polymer during processing or knitting such as a metal salt or soap of an organic fatty acid or naphthenic acid.

DETAILED DESCRIPTION OF THE PREFERRED EMBODIMENTS OF THE INVENTION

It has surprisingly been discovered that spandex with excellent tenacity, elongation, retractive power, set and other properties is obtained when an isocyanate-terminated prepolymer produced with an isocyanate-reactive component that includes at least one PTMEG and at least one ultra-low unsaturation polyoxypropylene glycol having a molecular weight greater than about 1500 Da in the presence of a specific type of catalyst is chain extended and spun. The catalyst employed must promote linear polymerization without causing degradation of the polyurethane/urea during processing or knitting. Metal salts of organic, monobasic acids (sometimes referred to as "fatty acids") such as zinc octoate and metal salts of naphthenic acid possess this combination of properties. In the present invention, the catalyst is included in the prepolymer-forming mixture in an amount of at least about 0.002% by weight (i.e., 20 ppm), based on total weight of isocyanate-reactive component, preferably from about 0.002 (20 ppm) to about 0.02% by weight (200 ppm).

The polyurethane/ureas of the present invention are prepared from isocyanate-terminated prepolymers. Suitable prepolymers are produced by reacting an isocyanate-reactive component, typically a polyol component which is generally composed of diols with an excess of diisocyanate, in the presence of the required catalyst. The isocyanate-terminated prepolymers typically used to produce this type of polyurethane/urea generally have a relatively low isocyanate content. Isocyanate contents of from about 1 to about 3.75% are preferred. Particularly preferred prepolymers have isocyanate contents of from about 2 to about 3.5%. The prepolymer is then chain extended in solution with an aliphatic or cycloaliphatic diamine to form the elastomer.

A key feature of the present invention is the acceleration of the prepolymer-forming reaction with a catalyst which (1) promotes linear polymerization during the prepolymer-forming reaction but (2) does not cause degradation of the polyurethane/urea at high temperature, particularly under spinning conditions and in knitting operations. Suitable catalysts include the metal salts or soaps of $C_6$–$C_{20}$ monocarboxylic acids and of naphthenic acid. Suitable metals include zinc, tin, barium, lead, calcium, cerium, cobalt, copper, lithium, manganese, bismuth, and zirconium. The catalyst may be a single compound or a combination of materials. The catalyst may be used "neat" or dispersed in a suitable carrier such as white spirits, mineral spirits, mineral oil, xylene, fatty acid ester, or dimethylacetamide. Zinc octoate and calcium octoate are examples of particularly preferred catalysts. The suitability of other catalytic materials for use in the present invention may be readily determined in accordance with techniques known to those in the art.

The catalyst may be added separately to the prepolymer-forming reaction mixture or included in the isocyanate-reactive component or in one of the other materials (preferably one of the diols) included in the isocyanate-reactive component. The catalyst is generally used in an amount of at least 0.002% by weight (20 ppm), based on the total weight of the isocyanate-reactive component, preferably in an amount of from about 0.002 to about 0.02% by weight, most preferably from about 0.002 to about 0.01% by weight. Although amounts of greater than 0.02% by weight of catalyst may be used in the practice of the present invention, inclusion of such amounts of catalyst could increase the cost of the process to such an extent that the advantages achieved by use of the catalyst are outweighed by the expense of the catalyst.

Any of the known aliphatic and/or aromatic diisocyanates may be used to produce the isocyanate-terminated prepolymers employed in the present invention. Preferred isocyanates include: linear aliphatic isocyanates such as 1,2-ethylene diisocyanate, 1,3-propylene diisocyanate, 1,4-butylene diisocyanate, 1,6-hexylene diisocyanate, 1,8-octylene diisocyanate, 1,5-diisocyanato-2,2,4-trimethylpentane, 3-oxo-1,5-pentane diisocyanate, and the like; cycloaliphatic diisocyanates such as isophorone diisocyanate, the cyclohexane diisocyanates, preferably 1,4-cyclohexane diisocyanate, fully hydrogenated aromatic diisocyanates such as hydrogenated tetramethylxylylene diisocyanate, hydrogenated toluene diisocyanates, and hydrogenated methylene diphenylene diisocyanates; and aromatic diisocyanates such as the toluene diisocyanates, particularly the 2,4-isomer, the methylene diphenylene diisocyanates, particularly 4,4'-methylene diphenylene diisocyanate (4,4'-MDI), tetramethylxylylene diisocyanate, and the like. 4,4'-MDI is particularly preferred.

The isocyanate-reactive component used to prepare the isocyanate-terminated prepolymers includes: (1) at least 10 equivalent percent of at least one high molecular weight, low unsaturation polyoxypropylene glycol and (2) up to 90 equivalent percent of one or more PTMEG's.

The unsaturation level of the high molecular weight polyoxypropylene polyol component employed in the present invention must be less than or equal to 0.03 meq/g. Most preferably, the entire amount of high molecular weight polyoxyalkylene polyol present in the isocyanate-reactive component has an unsaturation level of less than 0.03 meq/g, more preferably less than 0.02 meq/g, and most preferably less than 0.015 meq/g.

As used herein, the term "low unsaturation polyoxypropylene polyol (or glycol)," means a polymer glycol prepared by oxypropylating a dihydric initiator with propylene oxide in the presence of a catalyst in a manner such that the total unsaturation of the polyol product is less than or equal to 0.03 meq/g.

The polyoxypropylene glycol may contain oxyethylene moieties distributed randomly or in block fashion. If the oxyethylene moieties are contained in a block, the block is preferably a terminal block. However, randomly distributed oxyethylene moieties are preferred when such moieties are present. In general, the polyoxypropylene glycol should contain no more than about 30 weight percent of oxyethylene moieties, preferably no more than 20 percent, and more preferably no more than about 10 percent. The polyoxypropylene glycol may also contain higher alkylene oxide moieties such as those derived from 1,2- and 2,3-butylene oxide and other higher alkylene oxides, or oxetane. The amount of such higher alkylene oxides may be as much as 10–30% by weight of the polyoxypropylene polyol. However, preferably, the polyoxypropylene polyol is substantially derived from propylene oxide or propylene oxide in admixture with minor amounts of ethylene oxide. All such polyols containing a major portion of oxypropylene moieties are considered polyoxypropylene glycols as that term is used herein.

The high molecular weight, low unsaturation polyoxypropylene glycols useful in the practice of the present invention will generally have a molecular weight of at least about 1500 Da, preferably at least about 2000 Da, and may range up to 20,000 Da or higher. It is particularly preferred that the molecular weight be in the range of from about 3000 Da to about 8,000 Da, and most preferably be in the range of from about 4000 Da to about 8000 Da.

"Molecular weight(s)" and "equivalent weight(s)" as used herein are expressed in Da (Daltons) and are the number average molecular weight(s) and number average equivalent weight(s), respectively, unless specified otherwise.

The number average molecular weight for each polyether glycol is determined from the hydroxyl number of the polyether glycol as measured by the imidazole-pyridine catalyst method described by S. L. Wellon et al., "Determination of Hydroxyl Content of Polyurethane Polyols and Other Alcohols", ANALYTICAL CHEMISTRY, Vol. 52, NO. 8, pp. 1374–1376 (July 1980).

It is, of course, possible to use a blend of more than one high molecular weight polyoxypropylene polyol, or to add low molecular weight diols in a minor quantity. However, when such blends are used, the average molecular weight of the blend of high molecular weight components should be at least 1500 Da.

Preferably, the prepolymers are prepared from substantially all difunctional polyols, particularly those which are polyoxypropylene glycol-derived, that may include a minor amount, i.e., up to about 5 weight percent or more of a triol.

The polytetramethylene ether glycol (PTMEG) used to make the polyurethane/ureas of the present invention has a molecular weight greater than 200 Da, preferably from about 200 to about 6,000 Da, most preferably from about 600 to about 3,000 Da.

The PTMEG may be prepared by any of the known methods. One suitable method is the polymerization of tetrahydrofuran in the presence of a Lewis acid catalyst. Suitable polymerization catalysts include anhydrous aluminum chloride and boron trifluoride.etherate. Such catalysts are well known and are the subject of numerous patents and publications. PTMEG polyols are commercially available in a variety of molecular weights from numerous sources. For example, DuPont sells PTMEG polyols under the trademark Terathane®. BASF Corporation sells PTMEG polyols under the designation PolyTHF. Penn Specialty Chemicals, Inc. sells such polyols under the trademark POLYMEG®.

The isocyanate-reactive component used to produce the prepolymer from which the spandex fibers of the present invention are produced is predominantly a diol component, i.e., the diol component is from about 10 to about 100 equivalent %, preferably from about 30 equivalent percent to about 90 equivalent percent and more preferably from about 60 equivalent percent to about 90 equivalent percent of a polyoxypropylene diol component having an average unsaturation less than or equal to 0.03 meq/g, preferably less than about 0.02 meq/g, and most preferably less than about 0.015 meq/g. The remainder of the diol component is preferably PTMEG.

However, it should be noted that polyoxypropylene diols having unsaturation levels greater than 0.03 meq/g may be included in the polyol component used to produce the prepolymers of the present invention provided that the overall average unsaturation level of the total polyoxyalkylene portion of the polyol component is about 0.03 meq/g or lower.

The diol component used in the practice of the present invention includes: (1) up to 90 equivalent percent of one or more PTMEG diols, and (2) at least 10 equivalent percent of one or more polyoxyalkylene diols having an average unsaturation level in the polyoxyalkylene diol portion of the diol component less than or equal to 0.03 meq/g. The isocyanate-reactive component used to make prepolymers suitable for use in the practice of the present invention includes this diol component and any other hydroxyl or other reactive species which, together with the diol component, will form an isocyanate-terminated prepolymer when reacted with the isocyanate component.

The isocyanate-reactive component is reacted with an excess of the desired diisocyanate, preferably under an inert atmosphere or under vacuum at slightly elevated temperature, i.e., between 50° C. and 100° C., more preferably between 60° C. and 90° C. The amount of excess isocyanate is selected so as to provide a % NCO group content in the prepolymer of between about 1.0 weight percent and 3.75 weight percent, preferably between 2 and 3.5 weight percent. The reaction of the isocyanate with the polyol must be catalyzed with a catalyst that promotes linear polymerization but does not degrade the polymer during processing, such as zinc octoate, in an amount of at least 0.002% by weight.

The isocyanate-terminated prepolymer is then generally dissolved in a solvent, generally a polar aprotic solvent such as dimethyl acetamide, dimethyl formamide, dimethyl sulfoxide, N-methylpyrrolidone, or the like, and then chain-extended with a chain extender such as a diamine.

The term "polar aprotic solvent" as used herein means a solvent having the capability to dissolve the chain extended polyurethane at the desired concentration while being essentially non-reactive to isocyanate groups.

The polyurethane/urea thus obtained has both hard and soft segments. The terms "soft segment" and "hard segment" refer to specific portions of the polymer chains. The soft segments are the polyether-based portions of the segmented polyurethane/urea polymer, derived from the PTMEG and the polyoxypropylene glycol. The hard segments are those portions of the polymer chains that are derived from the diisocyanate and chain extender. The term "NCO content" refers to the isocyanate group content of the prepolymer, before chain extension.

Any of the known chain extenders may be used in the process of the present of the present invention. Ethylene diamine is the preferred chain extender. Ethylene diamine may be used alone or in combination with other aliphatic or cycloaliphatic diamines. Examples of such other aliphatic and cycloaliphatic diamines include: 1,2-diaminopropane; isophorone diamine; methyl-1,3-diaminocyclohexane; 1,3-diaminocyclohexane; 2-methylpentamethylenediamine (available under the trademark Dytek A from DuPont); 1,4-diamino-2-methylpiperazine; 1,4-diamino-2,5-dimethylpiperazine; methyl bis-propylamine; hydrazine; 1,3-propylene diamine; and tetramethylene diamine.

A chain terminator is generally included in the reaction mixture to adjust the final molecular weight, and thus the intrinsic viscosity, of the polyurethane/urea polymer to the desired value. Usually, the chain terminator is a monofunctional compound such as a secondary amine (e.g., diethylamine or dibutylamine).

Any of the processes for producing spandex polymers known to those skilled in the art may be used to produce the polyurethane/ureas and spandex fibers of the present invention. Such processes are disclosed, for example, in U.S. Pat. Nos. 3,384,623; 3,483,167; and 5,340,902, which are herein incorporated by reference.

Having generally described this invention, a further understanding can be obtained by reference to certain specific examples which are provided herein for purposes of illustration only and are not intended to be limiting unless otherwise specified.

EXAMPLES

Measuring Methods

The properties of the spandex materials produced in the Examples were determined as follows:

(1) The intrinsic viscosities η of the elastomers were measured in dilute solution having a concentration c of 0.5 g/100 ml dimethyl acetamide at 30° C. by determination of the relative viscosity $\eta_r$ against the pure solvent and were converted in accordance with the following equation:

$\eta_r = t_1/t_0$ where:

$t_1$ is the throughflow time (sec) of the polymer solution
$t_0$ is the throughflow time (sec) of the pure solvent $\eta = (Ln \ \eta_r)/c$ (2) Tenacity and elongation were determined in accordance with DIN 53 815 (cN/dtex).

(3) The set or residual elongation was determined after 5×300% elongation with a recovery period of 60 seconds in between. Set is a measure of the fiber's ability to be stretched and then return to its original length. Any excess length is measured as percent set or residual elongation, and low values are desirable. Typical percent sets of PTMEG-derived spandex fibers are less than 30 percent, preferably less than 25 percent.

(4) The heat distortion temperature (HDT) and hot tear time (HTT) are measured by the methods described in Chemiefasern/Texti-industrie, January 1978, No, 1/78, Vol. 28/80, pages 44–49. Relevant particulars can also be found in DE-OS 2 542 500 (1975).

The materials used in the Examples were as follows:

| | |
|---|---|
| POLYOL A: | A propylene oxide-based diol having a number average molecular weight of 2,000 and an unsaturation level of 0.005 meq/g. |
| POLYOL B: | A propylene oxide-based diol having a number average molecular weight of 4,000 and an unsaturation level of 0.005 meq/g. |
| POLYOL C: | A polyol blend having a number average molecular weight of 4,000 and an average unsaturation level of 0.020 meq/g prepared from 40 wt. % of a polyoxypropylene diol having an unsaturation level of 0.005 meq/g (prepared with a DMC catalyst) and 60 wt. % of a polyoxypropylene diol having an unsaturation level of 0.030 meq/g (prepared with a cesium hydroxide catalyst). |
| POLYOL D: | A propylene oxide-based diol having a number average molecular weight of 8,000 and an average unsaturation level of 0.005 meq/g. |
| POLYOL E: | A polytetramethylene ether glycol having a number average molecular weight of 1,000 which is commercially available from BASF under the trademark PolyTHF 1000. |
| POLYOL F: | A polytetramethylene ether glycol having a number average molecular weight of 2,000 which is commercially available from BASF under the trademark PolyTHF 2000. |
| POLYOL G: | A polytetramethylene ether glycol having a number average molecular weight of 250 which is commercially available from BASF under the name PolyTHF 250. |
| MDI: | 4,4'-diphenylmethane diisocyanate. |
| ZNO: | Zinc octoate (8% zinc octoate in dimethylacetamide). |
| DMAc: | Dimethylacetamide. |
| EDA: | Ethylene diamine. |
| IPDA: | Isophorone diamine. |
| DEA: | Diethylamine. |
| TPG: | Tripropylene glycol. |
| DBTDL: | Dibutyltindilaurate. |
| DBU: | 1,8-diazabicyclo(5,4,0)undec-7-en. |

Example 1

A blend of 1495 g of POLYOL A and 996.5 g of POLYOL F was dehydrated in a vacuum for 1 hour at 120° C. After cooling to room temperature, 50 ppm of ZNO were mixed into the polyols. 531.9 g of MDI were added at 55° C. The reaction mixture was heated for 75 minutes at 80° C. until the prepolymer had an NCO content of 2.39%.

At 60° C., 1296.4 g of DMAc were added to the prepolymer and the mixture was cooled to 25° C. The homogenized mixture of prepolymer and DMAc had an NCO content of 1.62%.

18.48 g of EDA, 9.52 g of IPDA, 1.36 g of DEA and 2474 g DMAc were added to 1804 g of the diluted prepolymer with rapid mixing. After one hour of mixing, the resulting solution had a viscosity of 55 Pa·s. An additional 69 g of the diluted prepolymer were added and allowed to mix for 30 minutes. At this point, the solution had a viscosity of 89 Pa·s. An additional 39.2 g of diluted prepolymer were added and allowed to mix for 30 minutes. This resulted in a final solution viscosity of 102 Pa·s, a solids content of approximately 30%, and an intrinsic viscosity of 1.56 dL/g. 0.3% by weight Mg stearate, 2.0% by weight Cyanox® 1790 antioxidant (commercially available from Cyanamid), 0.5% by weight Tinuvin® 622 stabilizer (commercially available from Ciba-Geigy), and 0.3% by weight of the polyether siloxane Silwet® L7607 (a product of Union Carbide Corp., USA) were added to the viscous polymer solution (quantities based on polyurethane solids). The solution was then dry spun to form 40 denier fibers.

The properties of the polymer solution and of the fibers made from this solution are reported in TABLE 1.

Example 2

A blend of 1721.5 g of POLYOL B and 1176 g of POLYOL E was dehydrated in a vacuum for 1 hour at 120° C. After cooling to room temperature, 50 ppm of ZNO were mixed into the polyols. 724.4 g of MDI were added at 55° C. The reaction mixture was heated for 90 minutes at 80° C. until the prepolymer had an NCO content of 3.04%.

At 60° C., 1553.0 g of DMAc were added to the prepolymer and the mixture was cooled to 25° C. The homogenized mixture of prepolymer and DMAc had an NCO content of 2.00%.

21.81 g of EDA, 11.10 g of IPDA, 0.95 g of DEA and 2348 g DMAc were added to 1702 g of the diluted prepolymer with rapid mixing. After one hour of mixing, the resulting solution had a viscosity of 30.8 Pa·s. An additional 65.4 g of the diluted prepolymer were added and allowed to mix for 30 minutes. At this point the solution had a viscosity of 57 Pa·s. An additional 43.1 g of diluted prepolymer were added and allowed to mix for 30 minutes. This resulted in a final solution viscosity of 82 Pa·s, a solids content of approximately 30%, and an intrinsic viscosity of 1.22 dL/g.

0.3% by weight Mg stearate, 2.0% by weight Cyanox® 1790 anti-oxidant (available from Cyanamid), 0.5% by weight Tinuvin® 622 stabilizer (Ciba-Geigy), and 0.3% by weight of the polyether siloxane Silwet® L7607 (a product of Union Carbide Corp., USA) were added to the viscous polymer solution (quantities based on polyurethane/urea solids). The solution was then dry spun to form 40 denier fibers.

Examples 3–5

The procedures for the production of the polyurethane/urea and fibers were the same as those used in Examples 1 and 2. The specific polyol, prepolymer, and polymer solution compositions and the properties of the polymer solutions and of fibers produced from those solutions are given in TABLE 1.

TABLE 1

| Example | 1 | 2 | 3 | 4 | 5* |
|---|---|---|---|---|---|
| POLYOL | A | B | C | D | D |
| Equivalent % | 60 | 27 | 27 | 11.42 | 11.42 |
| Weight % | 60 | 59.4 | 59.7 | 50.8 | 50.8 |
| POLYOL | F | E | E | E | E |
| Equivalent % | 40 | 73 | 73 | 88.58 | 88.58 |
| Weight % | 40 | 40.6 | 40.3 | 49.17 | 49.17 |
| Molecular Weight of Overall Blend | 2000 | 1800 | 1800 | 1800 | 1800 |
| NCO:OH | 1.70 | 1.8 | 1.8 | 1.8 | 1.8 |
| Prepolymer Viscosity, Pa · s (50° C.) | 18.1 | 10.6 | 10.4 | 15.5 | 11.5 |
| Prepolymer Catalyst | 50 ppm ZNO | 50 ppm ZNO | 50 ppm ZNO | 50 ppm ZNO | None |
| Cook Time @ 80° C. | 1.25 hours | 1.5 hours | 2.0 hours | 1.8 hours | 7.3 hours |
| Amines: | | | | | |
| EDA, mole % | 82.5 | 83.5 | 84.0 | 83 | 81.5 |
| IPDA, mole % | 15 | 15 | 15 | 15 | 15 |
| DEA, mole % | 2.5 | 1.5 | 1.0 | 2.0 | 3.5 |
| Polymer Solution: | | | | | |
| % Solids | 30 | 30 | 30 | 30 | 30 |
| Polymer Solution Viscosity @ 50° C., Pa · s | 89 | 64 | 41 | 64 | 30.3 |
| Spinning Speed (m/min.) | 420 | 420 | 420 | 500 | 500 |
| Fiber properties: | | | | | |
| Tenacity (cN/dtex) | 1.31 | 1.21 | 1.16 | 1.24 | 1.24 |
| Actual Tenacity[1] (cN/dtex) | 9.37 | 8.10 | 8.15 | 8.07 | 8.21 |
| % Elongation | 615 | 569 | 599 | 552 | 562 |
| 400% Modulus, cN/dtex | 0.216 | 0.282 | 0.295 | 0.360 | 0.383 |
| 5th Cycle Unload Power @ 150%, cN/dtex | 0.022 | 0.021 | 0.022 | 0.021 | 0.019 |
| Set, % | 21 | 26 | 31 | 21 | 22 |
| Thermal Properties of Fiber: | | | | | |
| Heat Distortion Temp (° C.) | 155 | 162 | 158 | 163 | 163 |
| Hot Tear Time (sec) | 5.5 | 7.6 | 6.9 | 11 | 10.1 |
| Polymer Molecular Weight | | | | | |
| Fiber Mn (GPC) | — | — | — | 105,100 | 87,500 |

TABLE 1-continued

| Example | 1 | 2 | 3 | 4 | 5* |
|---|---|---|---|---|---|
| Fiber Mw (GPC) | — | — | — | 309,800 | 281,200 |
| Fiber Mw/Mn (GPC) | — | — | — | 2.95 | 3.21 |

*Comparative Examples
[1]Actual Tenacity = Tenacity calculated on basis of actual denier at break.

As can be seen from the data presented in TABLE 1, the spandex made in Examples 1–4 had excellent properties even though low unsaturation polyols of varying molecular weights were used in combination with PTMEG.

The significance of the catalyst required in the present invention is evident upon comparison of the "Cook Time" for the prepolymer and the physical properties of the fibers produced in Example 4 and comparative Example 5. In the absence of the required catalyst (Example 5), the time required to prepare the prepolymer was significantly longer than the time required in Example 4 (7.3 hrs. v 1.8 hrs.). In addition, when the prepolymer of comparative Example 5 was chain-extended in DMAc, the rheology was very sensitive to small changes in the terminator (DEA) so that a small change in the mono-amine level often resulted in the difference between obtaining a smooth polymer solution and an unspinnable gel. Comparison of the properties of the fibers produced in Example 4 and comparative Example 5 shows that use of the catalyst required in the present invention had no negative impact on the fiber properties or upon the polymer molecular weight as determined by gel permeation chromatography (GPC).

Comparison of the properties of the fibers produced in Example 4 and comparative Example 5 also shows that use of the catalyst required in the invention did not affect the thermal properties (Heat Distortion Temperature, Hot Tear Time) of the fibers.

Examples 6–7

Each of the prepolymers prepared in Example 6 and comparative Example 7 was prepared from the same polyol components. An 8000 MW low unsaturation PPG (POLYOL D) was blended with PTMEG-2000 (POLYOL F) and PTMEG-250 (POLYOL G) in the percentages shown in TABLE 2. Despite the high equivalent percentage of PTMEG, when no catalyst was included in the reaction mixture (comparative Example 7) it took a prohibitively long time for the reaction mixture to fully react. When the same reaction was carried out in the presence of a catalyst in accordance with the present invention (Example 6), prepolymer preparation was completed in less than two hours. 40 denier spandex fibers spun from the solutions prepared from each of the prepolymers gave similar properties and showed no evidence that the presence of the catalyst was detrimental to performance.

TABLE 2

| Example | 6 | 7* |
|---|---|---|
| POLYOL | D | D |
| Equivalent % | 13.56 | 13.56 |
| Weight % | 54.33 | 54.33 |
| POLYOL | F | F |
| Equivalent % | 40.16 | 40.16 |
| Weight % | 40.02 | 40.02 |
| POLYOL | G | G |
| Equivalent % | 46.28 | 46.28 |
| Weight % | 5.64 | 5.64 |
| MOLECULAR WEIGHT OF OVERALL POLYOL BLEND | 2000 | 2000 |
| NCO:OH | 1.65 | 1.65 |
| Cook Time | 1.8 @ 80° C. | 5 hrs. @ 80° C., then 18 hrs @ 50° C.[2] |
| Prepolymer Viscosity, Pa · s (50° C.) | 30.8 | 24.9 |
| Prepolymer Catalyst | 50 ppm ZNO | None |
| Amines: | | |
| EDA, mole % | 96 | 96 |
| DEA, mole % | 4 | 4 |
| Polymer Solution: | | |
| % Solids | 30 | 30 |
| Polymer Solution Viscosity @ 50° C., Pa · s | 58 | 45 |
| Intrinsic Viscosity, dL/g | 1.373 | 1.183 |
| Spinning Speed m/min. | 500 | 500 |
| Fiber properties: | | |
| Tenacity (cN/dtex) | 1.28 | 1.13 |
| Actual Tenacity[1] (cN/dtex) | 9.02 | 8.45 |
| % Elongation | 603 | 646 |
| 100% Modulus, cN/dtex | 0.053 | 0.047 |
| 200% Modulus, cN/dtex | 0.101 | 0.092 |
| 300% Modulus, cN/dtex | 0.160 | 0.144 |
| 400% Modulus, cN/dtex | 0.262 | 0.230 |
| 5th Cycle Unload Power @ 150%, cN/dtex | 0.020 | 0.019 |
| Set, % | 16 | 17 |
| Thermal Properties of Fiber: | | |
| Heat Distortion Temp (° C.) | 166 | 167 |
| Hot Tear Time (sec) | 12.6 | 12.2 |

*Comparative Example
[1]Actual Tenacity = Tenacity calculated on basis of actual denier at break.
[2]After cooking prepolymer 5 hours at 80° C., the NCO value was still 12% above the theoretical value of 2.26%. It was cooked overnight at 50° C. after which time the NCO value had reached 2.19%.

Examples 8–9

In these Examples, prepolymers and fibers prepared in accordance with the present invention are compared to those made with dibutyltin dilaurate, a catalyst commonly used to promote polyurethane-forming reactions.

The procedure of Example 1 was repeated using the materials listed in TABLE 3 in the amounts indicated in TABLE 3. The properties of the prepolymer solutions and of the fibers produced from those prepolymer solutions are also reported in TABLE 3.

TABLE 3

| Example | 8* | 9 |
|---|---|---|
| Equivalent %, POLYOL B | 32.1 | 32.1 |
| Weight %, POLYOL B | 73.0 | 73.0 |
| Equivalent %, POLYOL D | 4.4 | 4.4 |
| Weight %, POLYOL D | 20.0 | 20.0 |
| Equivalent %, TPG | 63.5 | 63.5 |
| Weight %, TPG | 7.0 | 7.0 |
| Molecular Weight of Overall Polyol Blend | 1750 | 1750 |
| NCO:OH | 1.80 | 1.80 |
| Prepolymer Viscosity, Pa · s (50° C.) | 13.4 | 10.5 |
| Prepolymer Catalyst | 50 ppm DBTDL | 50 ppm ZNO |
| Cook Time @ 80° C. | 2 hours | 2 hours |
| Amines: | | |
| EDA, mole % | 99 | 99 |
| DEA, mole % | 1 | 1 |
| Polymer Solution: | | |
| % Solids | 30 | 30 |
| Polymer Solution Viscosity @ 50° C., Pa · s | 35 | 32 |
| Intrinsic Viscosity, dL/g | 1.086 | 1.088 |
| Spinning Speed (m/min.) | 500 | 500 |
| Fiber properties: | | |
| Tenacity (cN/dtex) | 0.67 | 1.04 |
| Actual Tenacity[1] (cN/dtex) | 4.29 | 6.76 |
| % Elongation | 540 | 548 |
| 400% Modulus, cN/dtex | 0.313 | 0.404 |

*Comparative Example
[1]Actual Tenacity = Tenacity calculated on basis of actual denier at break.

It is readily apparent from the data in TABLE 3 that although the viscosities of the prepolymer solutions made with DBTDL and a catalyst of the type required in the claimed invention were comparable, the fibers produced in accordance with the present invention had significantly higher tenacity values than those produced using DBTDL.

Examples 10–11

In these Examples, prepolymer solutions and fibers produced in accordance with the present invention are compared to those produced from the same materials with the exception that DBTDL rather than ZNO is used as the catalyst.

The procedure of Example 1 was repeated using the materials indicated in TABLE 4 in the amounts indicated in TABLE 4. The properties of the prepolymers and of the fibers produced from these prepolymers are reported in TABLE 4.

TABLE 4

| Example | 10* | 11 |
|---|---|---|
| Equivalent %, POLYOL B | 32.1 | 32.1 |
| Weight %, POLYOL B | 73.0 | 73.0 |
| Equivalent %, POLYOL D | 4.4 | 4.4 |
| Weight %, POLYOL D | 20.0 | 20.0 |
| Equivalent %, TPG | 63.5 | 63.5 |
| Weight %, TPG | 7.0 | 7.0 |
| Molecular Weight of Overall Polyol Blend | 1750 | 1750 |
| NCO:OH | 1.80 | 1.80 |
| Prepol. Viscosity, Pa · s (50° C.) | 13.4 | 10.5 |
| Prepolymer Catalyst | 50 ppm DBTDL | 50 ppm ZNO |
| Cook Time @ 80° C. | 2 hours | 2 hours |
| Amines: | | |
| EDA, mole % | 84 | 84 |
| IPDA, mole % | 15 | 15 |
| DEA, mole % | 1 | 1 |
| Polymer Solution: | | |
| % Solids | 30 | 30 |
| Polymer Solution Viscosity @ 50° C., Pa · s | 24 | 21 |
| Intrinsic Viscosity, dL/g | 1.03 | 1.00 |
| Spinning Speed (m/min.) | 420 | 420 |
| Fiber properties: | | |
| Tenacity (cN/dtex) | 0.81 | 0.98 |
| Actual Tenacity[1] (cN/dtex) | 5.62 | 6.78 |
| % Elongation | 590 | 592 |
| 400% Modulus, cN/dtex | 0.267 | 0.320 |

*Comparative Example
[1]Actual Tenacity = Tenacity calculated on basis of actual denier at break.

As can be readily seen from the data in TABLE 4, fibers produced with the catalyst of the present invention had significantly higher modulus and tenacity properties than those made with the DBTDL catalyst.

The literature (e.g., U.S. Pat. Nos. 5,691,441 and 5,723,563) teaches that the reaction of an isocyanate with a polyol may be catalyzed with standard catalysts such as dibutyltin dilaurate (DBTDL), but such catalyst is not necessary for the reaction to occur. As can be seen from the results obtained in Comparative Examples 8 and 10, use of DBTDL does allow production of a polymer solution having desirable Theological characteristics. However, DBTDL can also promote depolymerization at high temperatures. (See, for example, U.S. Pat. No. 5,061,426.) Tin catalysts are also undesirable due to regulations recently implemented in Europe. Further, it has been shown (Comparative Examples 8 and 10) that the DBTDL catalyst adversely affects the tenacity and modulus of fibers produced from prepolymers made with DBTDL. More specifically, at a level of 50 ppm (0.005%) of DBTDL in the prepolymer, the product fiber had significantly reduced tenacity and modulus when compared to the fibers prepared in accordance with the present invention.

Examples 12–14

These Examples were conducted to determine if a non-metal catalyst could be used to produce a suitable polymer solution. One of the more commonly used amine catalysts, DBU (Polycat DBU=1,8-Diazabicyclo(5,4,0) undec-7-en available from Air Products & Chemicals Inc.) was used in Comparative Examples 13 and 14.

The procedure followed was the same as that which was used in Example 1. The materials and the amounts of those materials used are given in TABLE 5. The properties of the prepolymer solutions and of the fibers made with those prepolymer solutions are also reported in TABLE 5.

TABLE 5

| Example | 12 | 13* | 14* |
|---|---|---|---|
| Equivalent %, POLYOL A | 60.0 | 60.2 | 60.2 |
| Weight %, POLYOL A | 60.0 | 60.1 | 60.1 |
| Equivalent %, POLYOL F | 40.0 | 39.8 | 39.8 |
| Weight %, POLYOL F | 40.0 | 39.9 | 39.9 |
| Molecular Weight of Overall Polyol Blend | 1991 | 1978 | 1978 |
| NCO:OH | 1.7 | 1.7 | 1.7 |
| Prepolymer Catalyst | 50 ppm ZNO | 70 ppm DBU | 70 ppm DBU |
| Cook Time @ 80° C., min. | 60 | 120 | 120 |
| % of theoretical NCO | 98.2 | 97.5 | 97.5 |
| Prepolymer Viscosity @ 50° C., Pa · s | 18.1 | 18.2 | 18.2 |
| Amines: | | | |
| EDA, mole % | 82.5 | 82.5 | 80.5 |
| IPDA, mole % | 15 | 15 | 15 |
| DEA, mole % | 2.5 | 2.5 | 4.5 |
| Polymer Solution: | | | |
| % Solids | 30 | 30 | 30 |
| Polymer Solution Viscosity @ 50° C., Pa · s | 89 | GEL | GEL |
| Intrinsic Viscosity, dL/g | 1.556 | — | — |
| Spinnable? | YES | NO | NO |

*Comparative Example

The prepolymer viscosity and percentage of the theoretical NCO value obtained using DBU as the catalyst were similar to those obtained with 50 ppm of ZNO (catalyst within the scope of the present invention). However, when the DBU-based prepolymer was chain extended as shown in Comparative Example 13, a gel was obtained as the product. In comparative Example 14, even when a higher level of DEA terminator was used, the product was also a severe gel. In contrast, the prepolymer solution made in accordance with the present invention was successfully spun into fiber. These results suggest that the DBU promotes both the isocyanate-hydroxyl reaction and branching reactions during the prepolymer synthesis. When such a prepolymer is chain extended, a highly cross-linked network which is totally unsuitable for dry spinning is obtained.

Having now fully described the invention, it will be apparent to one of ordinary skill in the art that many changes and modifications can be made thereto without departing from the spirit or scope of the invention as set forth herein.

What is claimed is:

1. A process for the production of a polyurethane/urea in solution comprising
   a) reacting
      1) a diisocyanate
      with
      2) an isocyanate-reactive component comprising
         (i) a diol component comprising
            (a) from about 10 to about 100 equivalent percent of at least one polyoxypropylene diol having a number average molecular weight of at least about 1500 Da and an average unsaturation level less than or equal to 0.03 meq/g,
            (b) up to 90 equivalent percent of at least one polytetramethylene glycol having a number average molecular weight of at least 200 Da, and optionally,
         (ii) an isocyanate-reactive material which is different from 2)(i)(a) and 2)(i)(b),
      in the presence of
      3) a catalyst which promotes linear polymerization but does not cause degradation of a polymer produced therewith under processing conditions,
      in amounts such that an NCO prepolymer having an NCO group content of from about 1.0 to about 3.75% will be formed, and
   b) chain extending the NCO prepolymer with
      4) at least one aliphatic diamine chain extender
      in
      5) a solvent
      to form the polyurethane/urea in solution.

2. The process of claim 1 in which the catalyst is used in an amount of from about 0.002 to 0.020% by weight, based on the diol component.

3. The process of claim 1 in which the catalyst used is a metal salt or soap of a $C_6$–$C_{20}$ monocarboxylic acid or of naphthenic acid.

4. The process of claim 1 in which the catalyst used is a naphthenic acid or a $C_6$–$C_{20}$ monocarboxylic acid salt of a metal selected from the group consisting of zinc, barium, lead, calcium, cerium, cobalt, copper, tin, lithium, manganese, bismuth, and zirconium.

5. The process of claim 1 in which the catalyst used is zinc octoate.

6. The process of claim 1 in which a chain terminator is employed.

7. The process of claim 1 further comprising a step of spinning the polyurethane/urea solution to form fiber.

8. The process of claim 1 in which from about 60 to about 90 equivalent percent of the diol component is polyoxypropylene diol (a).

9. The process of claim 1 in which the polyoxypropylene diol (a) has a number average molecular weight of from about 2000 to about 8000 Da.

10. The process of claim 1 in which the polyoxypropylene diol (a) has an unsaturation level of less than 0.02 meq/g.

11. The process of claim 1 in which the diisocyanate is 4,4'-diphenylmethane diisocyanate.

12. The process of claim 1 in which the solvent is a highly polar solvent.

13. The process of claim 1 in which the solvent is dimethyl acetamide.

14. The process of claim 1 in which the chain extender comprises ethylene diamine.

15. The polyurethane/urea produced by the process of claim 8.

* * * * *